United States Patent [19]
Lamberts et al.

[11] Patent Number: 5,372,789
[45] Date of Patent: Dec. 13, 1994

[54] DEVICE FOR THE PRODUCTION OF A REACTION MIXTURE

[75] Inventors: Wilhelm Lamberts, Leverkusen; James Thompson-Colon, Solingen; Wilfried Ebeling, Köln; Klaus Schulte, Leverkusen, all of Germany

[73] Assignee: Bayer Aktiengesellschaft, Leverkusen, Germany

[21] Appl. No.: 138,785

[22] Filed: Oct. 19, 1993

[30] Foreign Application Priority Data

Oct. 26, 1992 [DE] Germany ............... 4235970

[51] Int. Cl.⁵ ............... C08F 2/00; B01F 15/00; G05D 11/00
[52] U.S. Cl. ............... 422/133; 422/135; 366/142; 366/160; 366/161
[58] Field of Search ............... 422/131, 132, 133, 134, 422/135; 366/150, 154, 155, 156, 160, 161, 142; 425/200, 207; 222/136, 137, 145, 149

[56] References Cited

U.S. PATENT DOCUMENTS

| | | | |
|---|---|---|---|
| 4,068,831 | 1/1978 | Ebeling et al. | 366/156 |
| 4,165,187 | 8/1979 | James | 366/150 |
| 4,242,306 | 12/1980 | Kreuer et al. | 422/133 |
| 4,526,907 | 7/1985 | Thiele et al. | 521/133 |
| 4,773,764 | 9/1988 | Colombani et al. | 366/150 |

OTHER PUBLICATIONS

"Deltamat", No. 48 3T Aug. 1992 Ha, p. 3 in resect of the foaming agent supply (company publication).
MBT-150/MBT-155-Schwenkblatt-Viskositätsmesswertgeber mit elektrischem Ausgangssignal, D 218.20-21/lg.
TM Viskosität-Temperatur, TM-CAS-300.

Primary Examiner—Robert J. Warden
Assistant Examiner—Christopher Y. Kim
Attorney, Agent, or Firm—Joseph C. Gil

[57] ABSTRACT

In devices for the production of a reaction mixture, which forms a foamed plastic, from at least two reaction components and a foaming agent, it is possible to determine the content of foaming agent in a reaction component mixed therewith in that an intermediate container is provided for this mixture. The intermediate container is provided with a circulating line in which are arranged a circulating pump and a temperature-compensating viscometer. Optionally, the foaming agent content can be automatically adjusted to the theoretical value via a computer and pulse lines by influencing the drive means of the dosing pumps for the respective reaction component and the foaming agent.

2 Claims, 1 Drawing Sheet

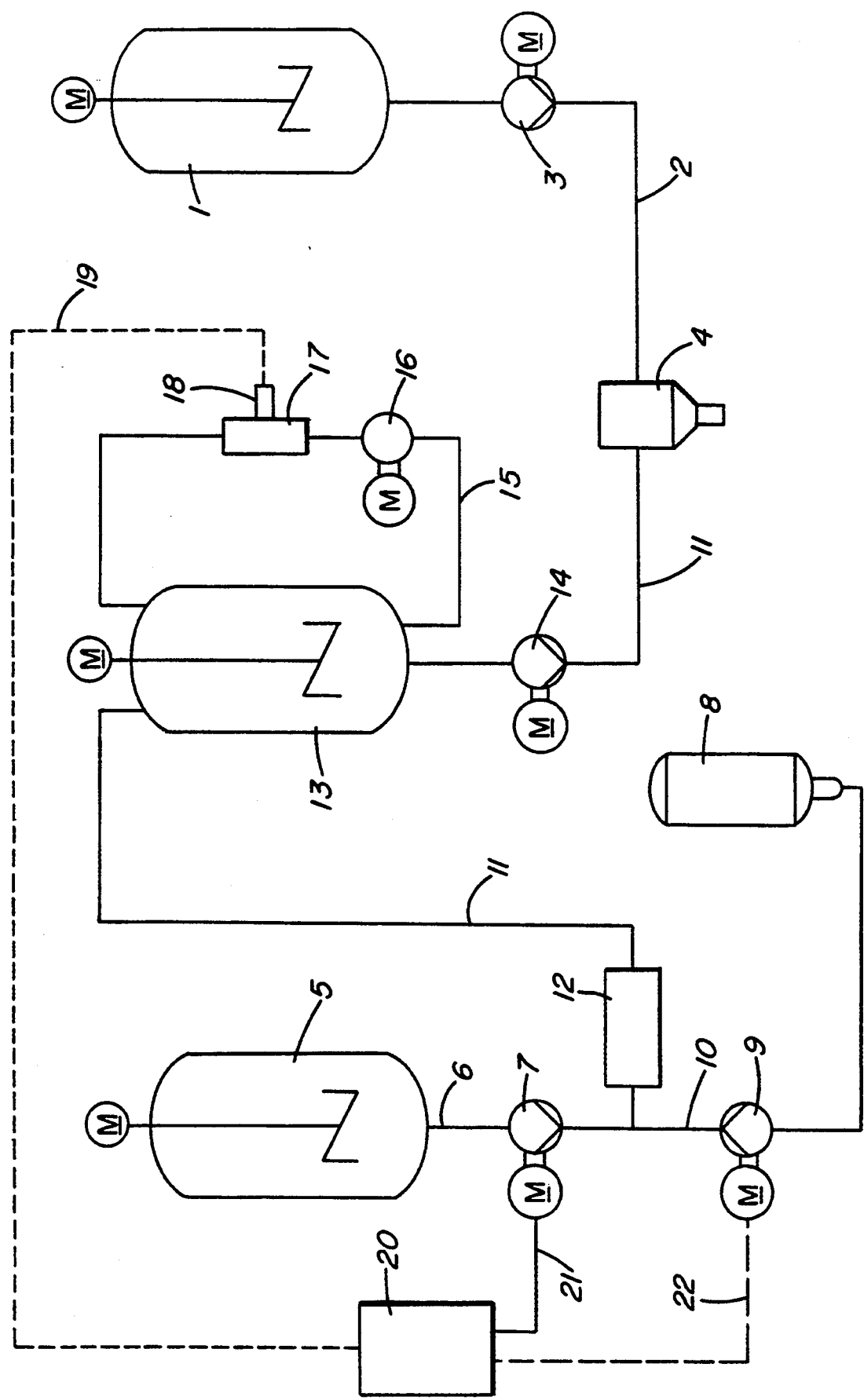

DEVICE FOR THE PRODUCTION OF A REACTION MIXTURE

BACKGROUND OF THE INVENTION

The present invention relates to a device for the production of a reaction mixture, which forms a foamed plastic, from at least two reaction components and a foaming agent.

A device of this kind is distributed by MASCHINENFABRIK HENNECKE GMBH, 30 Birlinghovener Strasse, D-53754 Sankt Augustin, and is described in the company publication "DELTAMAT", No. 48, 3T 08/92 Ha, page 3 in respect of the foaming agent supply.

Low-boiling foaming agents, such as R22 (compare "Kunststoffe" (Synthetic Resins) 80, 1990, Vol. 8, page 909) are being used to an increasing extent to replace foaming agents containing fluorinated hydrocarbons. The foaming agents are supplied in pressure containers of different sizes which can generally be directly coupled to the pipeline system. Mixing with the reaction components, generally with the polyol, is carried out at a pressure of approximately 20 bar, and the mixture is introduced into an intermediate container, in practice referred to as the "working container", and maintained under pressure. Monitoring devices, for example mass flow measuring devices, are used to monitor the precise adherence to the mixing ratio. The mixture produced in this way naturally possesses a lower vapor pressure than the foaming agent by itself; however, due to the pressure prevailing in the intermediate container, the mixture always remains in the liquid state.

If pressure differences occur in the intermediate container, or if air and/or foaming agent gases escape as a result of leaks from the agitator shaft, this can lead to losses of foaming agent from the produced mixture. These losses inevitably give rise to a changed, poorer quality of foamed plastic. Because of the volatility of the foaming agents, it is not possible to determine the foaming agent content under atmospheric conditions.

It is known from U.S. Pat. No. 4,526,907 to supply a recirculation line to the working container and to place in such a line a constant working circulating pump and a device for measuring the gas content.

The object exists of designing a device in such manner that it is possible to determine the current foaming agent content of the mixture continuously and under the pressure conditions prevailing in the intermediate container.

BRIEF DESCRIPTION OF THE DRAWING

FIG. 1 shows one embodiment of the present invention.

DESCRIPTION OF THE INVENTION

The above object is achieved by providing the intermediate container with a circulating line. A constantly operating circulating pump and a viscometer provided with a temperature compensation means are provided in the circulating line.

More particularly, the present invention is directed to a device for the production of a reaction mixture from at least two reaction components and a foaming agent. The device comprises:

a) a first storage vessel for one of the reaction component,
b) a first supply line leading from the first storage vessel to a premixer via a first dosing pump,
c) a second storage vessel for the foaming agent,
d) a second supply line leading from the second storage vessel to the premixer via a second dosing pump,
e) a third storage vessel for another of the reaction component,
f) a third supply line leading from the third storage vessel to a mix head via a third dosing pump,
g) a fourth supply line leading from the premixer to an intermediate storage container,
h) a fifth supply line leading from the intermediate storage container to the mix head via a fourth dosing pump,
i) a circulating line leading from the intermediate storage container via a constantly operating circulating pump and a viscometer back into the intermediate storage container, with the viscometer being provided with a temperature compensation means.

Viscometers of the type useable herein are commercially available and distributed, for example, by the company BTG ANLAGENTECHNIK GMBH, 8 Rensingstrasse, D-44807 Bochum. They are illustrated in the specification sheet D 218.20-21/lg "MBT-150/MBT-155—Schwenkblatt-Viskositätsmesswertgeber mit Elektrischem Ausgangssignal" (Swinging Blade Viscosity Sensors With Electric Output Signal) of this company. The company TECHMARK GMBH, 191 Landsberger Strasse, D-80687 Munich, also distributes viscometers; these are described in the company publication TM-CAS-300—"Die Neue Generation der Prozess-Viskositäts-Messgeräte mit Magnet-Technologie" (The New Generation of Process Viscosity Measuring Devices With Magnet Technology). Such viscometers operate with a pendulum which moves back and forth in the viscous liquid, the duration of one swing being measured as a gauge of the viscosity.

With the aid of the viscometer the existing viscosity of the mixture of foaming agent and reaction component can be determined as a measure of the content of foaming agent and on comparing this value with the required value the content of foaming agent can, if necessary, be adjusted.

Entirely surprisingly, it was discovered during experiments that even one part by weight of foaming agent in the polyol results in a difference in viscosity of sufficient magnitude to be able to be measured. However, for precise measurement it is necessary to compensate the viscosity of the mixture which is dependent upon temperature.

It was also surprising that, in the case of viscosity differences resulting from production in the starting component of for example 300 mPas, due to the substantial thinning effect, the final viscosity difference was only 10 mPas. However, the loss of one part by weight of foaming agent resulted in a change in viscosity of 40 mPas. The measured value can be analyzed via a computer and it is possible to determine whether the theoretical foaming agent content is present. If this is not the case, the operating personnel will compensate for the fault by appropriately changing the dosing ratio of reaction component and foaming agent.

Preferably the viscometer is connected via a pulse line to a computer which on the other side is connected via pulse lines to the drive means of the dosing pumps for the foaming agent and the reaction component which is to be mixed therewith. The correction process is automated in this way.

A device for the production of a polyurethane reaction mixture is shown purely schematically in the form of an exemplary embodiment in the drawing and will be explained in detail in the following:

From a storage vessel 1 for isocyanate, a supply line 2 leads via a dosing pump 3 to a mix head 4. A further supply line 6 with a dosing pump 7 leads from a storage vessel 5 for polyol. The supply line 6 is combined with a supply line 10, which leads from a foaming agent storage vessel 8 via a dosing pump 9, and thus forms a supply line 11. A static premixer 12, an intermediate container 13 and a dosing pump 14 are arranged in said supply line 11, before the supply line 11 leads into the mix head 4. This intermediate container 13 is assigned a circulating line 15 in which are arranged a constantly operating circulating pump 16 and a viscometer 17 with a temperature compensator 18. A pulse line 19 leads from the viscometer 17 to a computer 20. The computer 20 is connected via a pulse line 21 to the dosing pump 7 and via a pulse line 22 to the dosing pump 9.

The mode of operation of the new device is as follows: From the storage vessels 1 and 5, isocyanate and polyol are dosed in the preselected ratio by the dosing pumps 3 and 7 respectively. The dosing pump 9 also delivers a low boiling foaming agent in the desired quantity. In the premixer 12, polyol and foaming agent are mixed with one another and are fed via the supply line 11 into the intermediate container 13. The mixture contained in the intermediate container 13 is circulated via the circulating line 15 by means of the circulating pump 16 and the viscosity is measured by means of the viscometer 17, temperature differences being compensated in order to obtain a comparable value. The value is input into a computer and it is determined whether the foaming agent content corresponds to the theoretical value. In the case of deviations—generally it is a question of too low a foaming agent content—one or both of the dosing pumps 7 and 9 are adjusted in respect of their dosing quantity via the pulse lines 21 and/or 22 in order to re-establish the correct mixture ratio. The measuring process is carried out continuously, as is the necessary adjustment. Finally the mixture of polyol and foaming agent is fed via the dosing pump 14 into the mixer head 4 and is mixed with the isocyanate component.

What is claimed is:

1. A device for the production of a reaction mixture from at least two reaction components and a foaming agent, said device comprising:
    a) a first storage vessel for one of said reaction component,
    b) a first supply line leading from said first storage vessel to a premixer via a first dosing pump,
    c) a second storage vessel for said foaming agent,
    d) a second supply line leading from said second storage vessel to said premixer via a second dosing pump,
    e) a third storage vessel for one of said reaction component,
    f) a third supply line leading from said third storage vessel to a mixer head via a third dosing pump,
    g) a fourth supply line leading from said premixer to an intermediate storage container,
    h) a fifth supply line leading from said intermediate storage container to said mixer head via a fourth dosing pump,
    i) a circulating line leading from said intermediate storage container via a constantly operating circulating pump and a viscometer back into said intermediate storage container, said viscometer being provided with a temperature compensation means.

2. The device of claim 1, wherein said viscometer is connected via a pulse line to a computer, said computer also being connected via pulse lines to drive means of said first and second dosing pumps.

* * * * *